United States Patent [19]
Harada et al.

[11] Patent Number: 6,099,989
[45] Date of Patent: Aug. 8, 2000

[54] POLYMER SECONDARY BATTERIES

[75] Inventors: Gaku Harada; Koji Sakata; Junko Kurihara; Shinako Okada, all of Tokyo, Japan

[73] Assignee: NEC Corporation, Tokyo, Japan

[21] Appl. No.: 09/174,312

[22] Filed: Oct. 19, 1998

[30] Foreign Application Priority Data

Oct. 23, 1997 [JP] Japan ................................ 9-290943

[51] Int. Cl.$^7$ ...................................................... H01M 4/60
[52] U.S. Cl. ............................................................ 429/213
[58] Field of Search ..................................... 429/212, 213

[56] References Cited

U.S. PATENT DOCUMENTS

| 4,816,359 | 3/1989 | Nagele et al. . |
| 5,002,700 | 3/1991 | Otagawa et al. . |
| 5,183,543 | 2/1993 | Toyosawa et al. . |

FOREIGN PATENT DOCUMENTS

| 62-71169 | 4/1987 | Japan . |
| 62-195852 | 8/1987 | Japan . |
| 63-36319 | 2/1988 | Japan . |
| 1-072462 | 3/1989 | Japan . |
| 2-129851 | 5/1990 | Japan . |
| 3-62451 | 3/1991 | Japan . |
| 8-190910 | 7/1996 | Japan . |
| 10-261418 | 9/1998 | Japan . |

OTHER PUBLICATIONS

N. Oyama et al., "Organosulfur polymer batteries with high energy density", Journal of Power Sources, vol. 68, 1997, pp. 135–138. (No Month).

*Primary Examiner*—Maria Nuzzolillo
*Assistant Examiner*—Susy Tsang
*Attorney, Agent, or Firm*—Young & Thompson

[57] ABSTRACT

The present invention provides a polymer secondary battery comprising a pair of current collectors and electrodes arranged in opposed relationship with an electrolyte solution-containing separator or a solid electrolyte interposed therebetween, the polymer secondary battery having a structure in which a first polymer active material layer adjacent to the current collector of the negative electrode has laminated thereto at least one layer of a polymer material having an oxidation-reduction potential higher than that of the first polymer active material layer. This polymer secondary battery has a high rate of appearance of capacity, is capable of quick charging and discharging, and exhibits excellent cycle characteristics.

7 Claims, 2 Drawing Sheets

POLYMER SECONDARY BATTERIES

BACKGROUND OF THE INVENTION

1. Field of the Invention

This invention relates to polymer secondary batteries.

2. Description of the Prior Art

Conventionally, it has been disclosed that a polymer secondary battery in which the electrode active material constituting at least one of the negative and positive electrodes comprises an electrically conductive polymeric material may be utilized as a battery power supply for IC memory backup (Japanese Patent Laid-Open No. 36319/'88).

It is described therein that a secondary battery having a high capacity per unit weight of the electrode active material and excellent charge-discharge cycle characteristics can be obtained by using polyaniline as the electrically conductive polymeric material, and this makes it possible to construct an IC memory backup equipped with a battery power supply having higher performance.

Moreover, Japanese Patent Laid-Open No. 62451/'91 discloses an electrode for aqueous solution type batteries which comprises an electrochemically polymerized polyaniline matrix and a polymer chemically bonded to the polyaniline and containing an organic dopant having a sulfonic group.

However, conventional secondary batteries using a polymer for one or both electrodes have the disadvantage that, since the negative electrode material has low oxidation-reduction reactivity., the rate of appearance of capacity is low and they cannot be quickly charged or discharged.

SUMMARY OF THE INVENTION

Accordingly, an object of the present invention is to provide a polymer secondary battery which has a high rate of appearance of capacity, is capable of quick charging and discharging, and exhibits excellent cycle characteristics.

In order to accomplish the above object, the present inventors have now completed the present invention as a result of extensive investigations.

The present invention relates to a polymer secondary battery comprising a pair of current collectors and electrodes arranged in opposed relationship with an electrolytic solution-containing separator or a solid electrolyte interposed therebetween, the polymer secondary battery having a structure in which, with respect to one or both of the positive and negative electrodes, at least one layer of a material capable of causing an oxidation-reduction reaction based on the same chemical species is laminated to an active material layer constituting the electrode, the material used for the negative electrode having a formal oxidation-reduction potential higher than that of the active material layer adjacent to the current collector and the material used for the positive electrode having a formal oxidation-reduction potential lower than that of the active material layer adjacent to the current collector.

In the above-described polymer secondary battery of the present invention, it is preferable that the negative electrode comprises two or more active material layers each consisting of a polymer selected from among quinone polymers, nitrogen-containing heterocyclic compound polymers, nitrogen-containing condensed heterocyclic compound polymers and polyaniline type polymers.

Moreover, in the above-described polymer secondary battery of the present invention, it is preferable that a first negative electrode active material layer adjacent to the current collector consists of a polymer selected from among nitrogen-containing heterocyclic compound polymers and nitrogen-containing condensed heterocyclic compound polymers, and a second negative electrode active material layer formed on the first negative electrode active material layer consists of a polymer-selected from among quinone polymers, nitrogen-containing heterocyclic compound polymers, nitrogen-containing condensed heterocyclic compound polymers and polyaniline type polymer.

DETAILED DESCRIPTION OF PREFERRED EMBODIMENTS

Several embodiments of the present invention are specifically described hereinbelow.

First Embodiment

Figure 1:
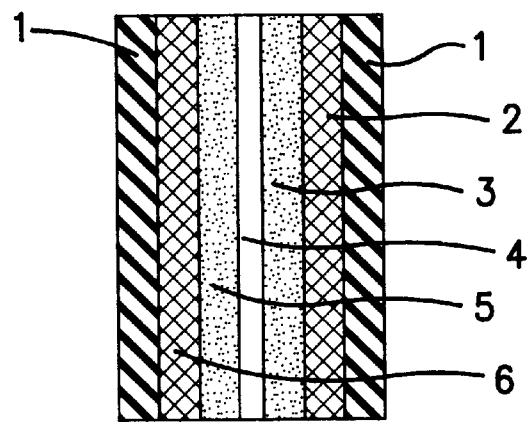
FIG. 1 is a schematic cross-sectional view of a polymer secondary battery in accordance with one embodiment of the present invention.

Referring to FIG. 1, the polymer secondary battery of the present invention generally has a structure in which, with respect to one or both of the negative and positive electrodes, an active material layer 3 or 5 comprising an active material capable of easily reacting with a chemical species required for oxidation-reduction reactions is laminated to a polymeric active material layer 2 or 6. Specifically, FIG. 1 illustrates a first embodiment of the present invention in which active material layers 3 and 5 each comprising an active material capable of easily reacting with a chemical species required for oxidation-reduction reactions are laminated to polymeric active material layers 2 and 6 of both negative and positive electrodes, respectively.

The materials used for this purpose are defined as follows. In the negative electrode, a material having a lower formal oxidation-reduction potential is used for negative electrode active material layer 2, and a material having a higher formal oxidation-reduction potential is used for negative electrode active material layer 3. In the positive electrode, a material having a higher formal oxidation-reduction potential than those of the active materials used in the negative electrode is used for positive electrode active material layer 5. For positive electrode active material layer 6, there is used a material having the highest formal oxidation-reduction potential of all materials constituting the polymer secondary battery. The materials used in the negative electrode may be selected from among quinone polymers; polyaniline type polymers; nitrogen-containing heterocyclic compound polymers such as polypyridine type and polypyrimidine type polymers of the formulae give below; and condensed compound polymers such as polyquinoline type polymers. A material having a lower formal oxidation-reduction potential is used for the layer adjacent to the current collector.

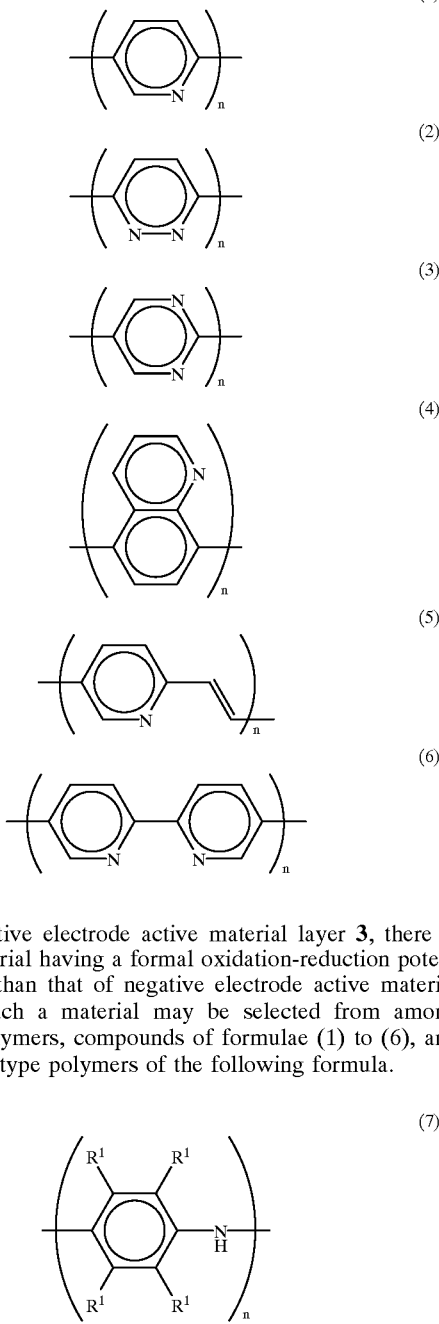

For negative electrode active material layer 3, there is used a material having a formal oxidation-reduction potential higher than that of negative electrode active material layer 2. Such a material may be selected from among quinone polymers, compounds of formulae (1) to (6), and polyaniline type polymers of the following formula.

In the last case, compounds having different formal oxidation-reduction potentials may be obtained by properly selecting substituent groups $R^1$. Substituent groups $R^1$ each independently represent H or an electron-donating group. This electron-donating group is a substituent group having a Hammett substituent constant of 0 or less, and examples thereof include H, $R^2$, $NHCOR^2$, $OR^2$, OH, $NH_2$ and $N(R^2)_2$ in which $R^2$ is an alkyl group of 1 to 10 carbon atoms and preferably a methyl or ethyl group.

Now, an example based on this embodiment (Example 1) is described below.

First of all, particulate active carbon having a surface area of 2,000 $cm^2/g$ and a particle diameter of 10 μm was mixed with carbon serving as an electrically conductive filler, and then with 15 wt. % of polyvinylidene fluoride (with an average molecular weight of 1,000) serving as a binder resin. Moreover, butyl phthalyl butyl glycol as a plasticizer, 2-(2-butoxyethoxy)ethanol as a boiling point modifier, and N-methylpyrrolidone (NMP) as a solvent were added thereto.

Using a doctor blade, the resulting slurry was spread on current collector sheets (made of butyl rubber and carbon) so as to form a film. The film so formed had a thickness of 50 μm. Thereafter, these sheets were cut into a predetermined shape and used as current collectors 1.

Next, polypyridine used as the active material for the formation of a negative electrode active material layer 2 was dissolved in formic acid at room temperature and its concentration was adjusted to 10 wt. %. A current collector 1 was vacuum-impregnated with the polypyridine solution so prepared, and vacuum-dried at room temperature to form a negative electrode active material layer 2. The measurement of its dry weight revealed that the weight of the deposited polypyridine was 2.0 mg. The polypyridine layer so formed had a thickness of not greater than 5 μm on the basis of observations by SEM.

Subsequently, dimethoxypolyaniline of the formula

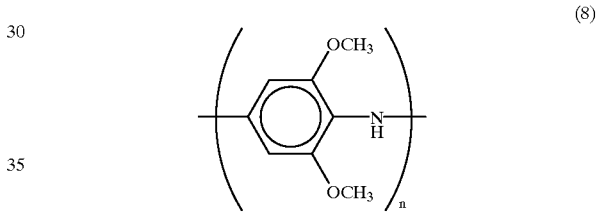

was dissolved in N-methylpyrrolidone (NMP) and its concentration was adjusted to 10 wt. %. Negative electrode active material layer 2 formed on current collector 1 was vacuum-impregnated with the dimethoxypolyaniline solution so prepared, and vacuum-dried at 40° C. to form a negative electrode active material layer 3. The dry weight of the deposited dimethoxypolyaniline was 2.0 mg. The dimethoxypolyaniline layer formed on the polypyridine layer had a thickness of not greater than 5 μm on the basis of observations by SEM.

This electrode was doped by soaking it in a 1M aqueous solution of polyvinylsulfonic acid (PVSA) at 70° C. for 6 hours. After completion of the doping, this electrode was washed with methanol, vacuum-dried at room temperature, and used as a negative electrode.

In order to fabricate a positive electrode, methylpolyaniline of the formula

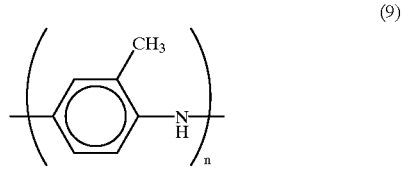

used as the active material for the formation of a positive electrode active material layer 6 was dissolved in NMP and its concentration was adjusted to 10 wt. %. Another current collector 1 was vacuum-impregnated with the methylpolyaniline solution so prepared, and vacuum-dried at 40° C. to form a positive electrode active material layer 6. The methylpolyaniline layer so formed had a thickness of not greater than 5 μm on the basis of observations by SEM.

This electrode was doped by soaking it in a 1M aqueous solution of polyvinylsulfonic acid at 70° C. for 6 hours, and thus made insoluble in NMP. After completion of the doping, this electrode was washed with methanol and vacuum-dried at room temperature. The dry weight of the deposited methylpolyaniline was 2.0 mg.

Subsequently, polyaniline of the formula

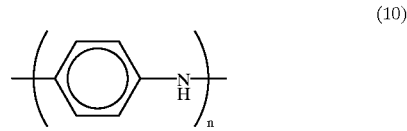

(10)

was dissolved in NMP and its concentration was adjusted to 10 wt. %. Positive electrode active material layer 6 formed on current collector 1 was vacuum-impregnated with the polyaniline solution so prepared, and vacuum-dried at 40° C. to form a positive electrode active material layer 5. The dry weight of the deposited polyaniline was 2.0 mg. The polyaniline layer formed on the methylpolyaniline layer had a thickness of not greater than 5 μm on the basis of observations by SEM.

This electrode was doped by soaking it in a 1M aqueous solution of polyvinylsulfonic acid (PVSA) at 70° C. for 6 hours. After completion of the doping, this electrode was washed with methanol, vacuum-dried at room temperature, and used as a positive electrode.

Finally, a polymer secondary battery was constructed by arranging the positive and negative electrodes in opposed relationship so that a separator 4 vacuum-impregnated with an electrolytic solution comprising a 6N aqueous solution of PVSA was interposed therebetween.

The completed polymer secondary battery was charged at a constant current of 34 μA (0.1 C) and then discharged at a constant current of 34 μA (0.1 C). Its theoretical capacity was assumed to be 172 mAh/g with consideration for the deactivation limit of polyaniline. As a result, the capacity in the voltage range of 1.0 to 0.2 V was 0.28 mAh and the rate of appearance of capacity (R) had a very high value of 80%. R is calculated by the following formula:

$$R(\%) = \frac{C_{\mathit{eff}}}{C_{spec} \times w} \times 100$$

where
R is the rate of appearance of capacity in %,
$C_{\mathit{eff}}$ is the effective capacity as measured by charging and discharging of the battery,
$C_{spec}$ is the lower theoretical specific capacity of the active material per unit weight,
W is the weight of active material of positive or negative electrode which has the lower theoretical specific capacity.

Moreover, this battery could be quickly charged and discharged at 40 mA (120 C). As to its cycle characteristics, the number of cycles which caused the capacity to decrease to 50% of the initial capacity was 10,000.

Although a 6N aqueous solution of PVSA was used as the electrolytic solution in this example, the present invention is not limited thereto and there may be used any organic electrolytic solution. Moreover, although polyvinylidene fluoride was used as the binder resin, the present invention is not limited thereto and there may be used any other resin that is not corroded by the electrolytic solution.

In the above-described construction, the materials used for negative electrode active material layers 2, 3 and positive electrode active material layers 5, 6 constituting the negative and positive electrodes, respectively, cause oxidation-reduction reactions based on the same chemical species (i.e., hydrogen ion in Example 1), whereby the secondary battery can be charged or discharged. Active material layers 3 and 5 are formed of materials which, during charging, react easily with the chemical species (i.e., hydrogen ion in Example 1) required for oxidation-reduction reactions in the negative and positive electrodes, respectively (i.e., a material having a relatively high formal oxidation-reduction potential on the negative electrode side and a material having a relatively low formal oxidation-reduction potential on the positive electrode side). As a result, a reaction releasing the chemical species occurs readily in the positive electrode, and a reaction absorbing the chemical species occurs readily in the negative electrode. As the reactions proceed, the concentration of the chemical species required for the oxidation-reduction reactions in active material layers 6 and 2 is reduced in positive electrode active material layer 5 or raised in negative electrode active material layer 3, respectively, as compared with the concentration of the chemical species in the electrolytic solution or solid electrolyte. That is, the concentration of the chemical species required for the oxidation-reduction reactions at the active material layer interfaces is reduced at the interface between positive electrode active material layers 5 and 6 or raised at the interface between negative electrode active material layers 2 and 3, as compared with the concentration of the chemical species in the electrolytic solution or solid electrolyte. Consequently, when the polymer battery is charged, the active materials of active material layers 2 and 6 can easily cause reactions for absorbing or releasing the chemical species, resulting in an improvement in the rate of appearance of capacity. Moreover, this accelerates the reactions and thereby enables the battery to be quickly charged and discharged.

Furthermore, since the electrodes have a laminated structure in the present invention, the first electrode layers do not come into contact with the electrolytic solution or solid electrolyte. Consequently, they are not oxidatively degraded by oxygen present in the electrolytic solution or solid electrolyte region, resulting in an improvement in cycle characteristics.

Second Embodiment

Figure 2:
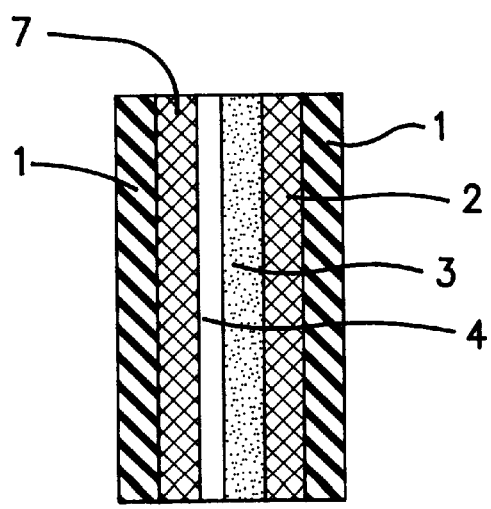
FIG. 2 is a schematic cross-sectional view of a polymer secondary battery in accordance with another embodiment of the present invention.

A second embodiment of the present invention is described below with reference to the accompanying drawings. Referring to FIG. 2, the electrode on the positive side has a single-layer structure consisting of a positive electrode active material layer 7 alone. Generally, positive electrode materials have a high reaction rate. Accordingly, when such a positive electrode material having a high reaction rate is used, a double-layer structure as has been described in connection with the first embodiment is not required and the positive electrode may have a single-layer structure. Moreover, since positive electrode materials are generally resistant to oxidation by oxygen present in the electrolytic solution or solid electrolyte region, the use of such a material can minimize a reduction in cycle characteristics.

This embodiment makes it possible to decrease the number of steps required for the manufacture of batteries without reducing battery characteristics, and to reduce the thickness of the batteries.

Now, an example based on this embodiment (Example 2) is described below.

A negative electrode was formed in the same manner as described in Example 1. The positive electrode had a single-layer structure consisting of a positive electrode active material layer 7 alone. First of all, methylpolyaniline was dissolved in NMP and its concentration was adjusted to 10 wt. %. Then, a current collector 1 was vacuum-impregnated with the methylpolyaniline solution so prepared and vacuum-dried at 40° C. to form a positive electrode active material layer 7. The dry weight of the deposited methylpolyaniline was 2.0 mg. The methylpolyaniline layer so formed had a thickness of not greater than 5 $\mu$m on the basis of observations by SEM.

This positive electrode active material layer 7 was doped by soaking it in a 1M aqueous solution of PVSA at 70° C. for 6 hours. After completion of the doping, the resulting electrode was washed with methanol, vacuum-dried at room temperature, and used as a positive electrode.

Finally, a polymer secondary battery was constructed in the same manner as described in Example 1.

The completed polymer secondary battery was charged at a constant current of 34 $\mu$A (0.1 C) and then discharged at a constant current of 34 $\mu$A (0.1 C). As a result, the capacity in the voltage range of 1.0 to 0.2 V was 0.28 mAh and the rate of appearance of capacity had a very high value of 80%. Moreover, this battery could be quickly charged and discharged at 40 mA (120 C). As to its cycle characteristics, the number of cycles which caused the capacity to decrease to 50% of the initial capacity was 10,000.

Although a 6N aqueous solution of PVSA was used as the electrolytic solution in this example, the present invention is not limited thereto and there may be used any organic electrolytic solution. Moreover, although polyvinylidene fluoride was used as the binder resin, the present invention is not limited thereto and there may be used any other resin that is not corroded by the electrolytic solution.

Third Embodiment

Figure 3:
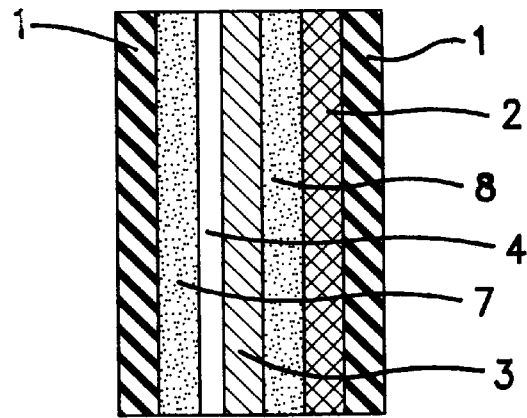
FIG. 3 is a schematic cross-sectional view of a polymer secondary battery in accordance with still another embodiment of the present invention.

A third embodiment of the present invention is described below with reference to the accompanying drawings. Referring to FIG. 3, the electrode on the positive side has a single-layer structure consisting of a positive electrode active material layer 7 alone. Generally, positive electrode materials have a high reaction rate. Accordingly, when such a positive electrode material having a high reaction rate is used, a double-layer structure as has been described in connection with the first embodiment is not required and the positive electrode may have a single-layer structure. Moreover, since positive electrode materials are generally resistant to oxidation by oxygen present in the electrolytic solution or solid electrolyte region, the use of such a material can minimize a reduction in cycle characteristics.

In Examples 1 and 2, the difference in formal oxidation-reduction potential between negative electrode active material layers 2 and 3 is as great as 300 mV (vs. Ag/AgCl). In this embodiment, therefore, the negative electrode has a three-layer structure in which a negative electrode active material layers 8 formed of polypyrimidine having a formal oxidation-reduction potential intermediate between those of negative electrode active material layers 2 and 3 is included as an intermediate layer.

In this embodiment, the oxidation-reduction reaction in negative electrode active material layer 2 is further accelerated by reducing the potential difference with negative electrode active material layer 2. Consequently, the secondary battery constructed in accordance with this embodiment can be discharged at higher currents.

Now, an example based on this embodiment (Example 3) is described below.

A negative electrode active material layer 2 was formed in the same manner as described in Example 1. Thereafter, polypyrimidine used as the active material for the formation of a negative electrode active material layer 8 was dissolved in sulfuric acid and its concentration was adjusted to 10 wt. %. Negative electrode active material layer 2 formed on current collector 1 was vacuum-impregnated with the polypyrimidine solution so prepared, and vacuum-dried at 40° C. to form a negative electrode active material layer 8. After drying, this negative electrode active material layer 8 was washed with water until the washings became neutral, washed with methanol, and vacuum-dried at room temperature. The dry weight of the deposited polypyrimidine was 1.5 mg. The polypyrimidine layer so formed had a thickness of not greater than 4 $\mu$m on the basis of observations by SEM.

Subsequently, a negative electrode active material layer 3 was formed according to the procedure described in Example 1. Thus, a negative electrode was fabricated.

Next, a positive electrode was fabricated by forming a positive electrode active material layer 7 of methylpolyaniline according to the procedure described in Example 2.

Finally, a polymer secondary battery was constructed in the same manner as described in Example 1.

The completed polymer secondary battery was charged at a constant current of 34 $\mu$A (0.1 C) and then discharged at a constant current of 34 $\mu$A (0.1 C). As a result, the capacity in the voltage range of 1.0 to 0.2 V was 0.3 mAh and the rate of appearance of capacity had a very high value of 85%. Moreover, this battery could be quickly charged and discharged at 50 mA (150 C). As to its cycle characteristics, the number of cycles which caused the capacity to decrease to 50% of the initial capacity was 15,000.

Although a 6N aqueous solution of PVSA was used as the electrolytic solution in this example, the present invention is not limited thereto and there may be used any organic electrolytic solution. Moreover, although polyvinylidene fluoride was used as the binder resin, the present invention is not limited thereto and there may be used any other resin that is not corroded by the electrolytic solution.

Comparative Example

Figure 4:
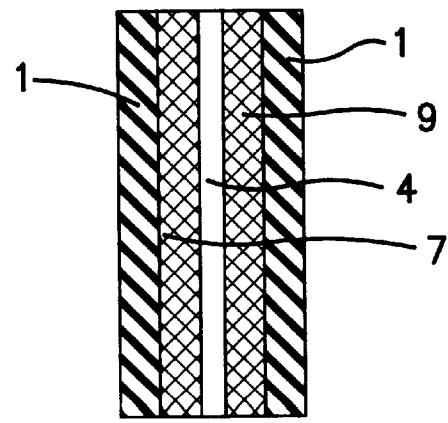
FIG. 4 is a schematic cross-sectional view of a conventional polymer secondary battery constructed in a comparative example.

FIG. 4 is a schematic cross-sectional view of a conventional polymer secondary battery. In this comparative example, both the negative electrode and the positive electrode have a single-layer structure consisting of a negative electrode active material layer 9 alone and a positive electrode active material layer 7 alone, respectively.

The aforesaid conventional secondary battery was constructed in the following manner. Current collectors 1 were made in the same manner as described in Example 1. Then, a negative electrode active material layer 9 consisting of polypyridine and a positive electrode active material layer 7 consisting of methylpolyaniline were formed and impregnated according to the procedures described in Example 1 to complete a polymer secondary battery. The weights of negative electrode active material layer 9 and positive electrode active material layer 7 were both 2.0 mg.

The conventional polymer secondary battery constructed in the above-described manner was charged at a constant current of 34 μA (0.1 C) and then discharged at a constant current of 34 μA (0.1 C). As a result, the capacity in the voltage range of 1.0 to 0.2 V was 0.01 mAh and the rate of appearance of capacity was 3%. Moreover, this battery could only be charged and discharged at a current of up to 1 C. As to its cycle characteristics, the number of cycles which caused the capacity to decrease to 50% of the initial capacity was 50.

Figure 5:
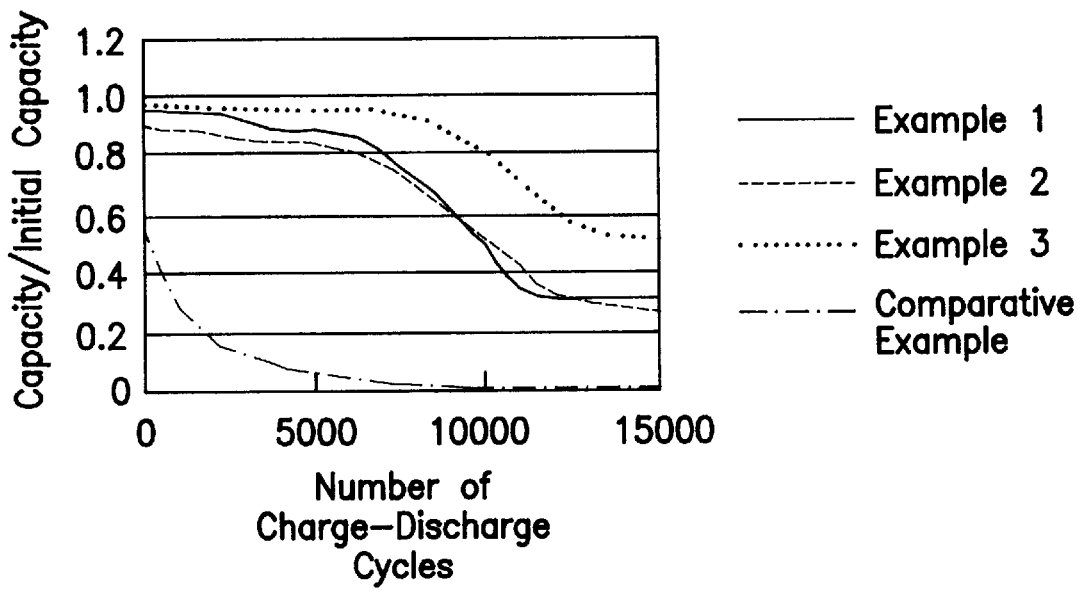
FIG. 5 is a graph showing the cycle characteristics of polymer secondary batteries constructed in several examples of the present invention and in a comparative example.
Figure 6:
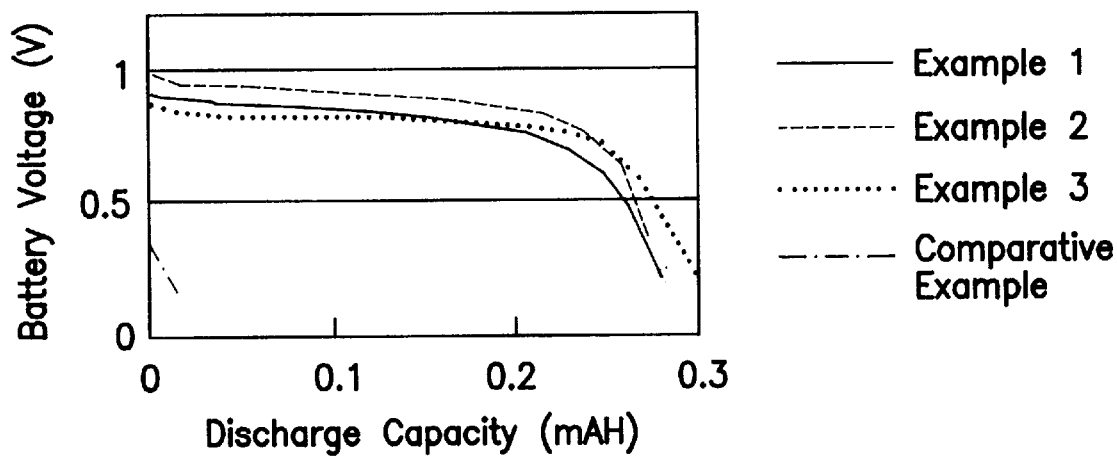
FIG. 6 is a graph showing the discharge voltages of polymer secondary batteries constructed in several examples of the present invention and in a comparative example.

The above-described results are summarized in Table 1, FIG. 5 and FIG. 6.

TABLE 1

|  | Rate of appearance of capacity (%) | Quick charging and discharging (C) | Cycle characteristics (number of cycles) |
| --- | --- | --- | --- |
| Example 1 | 80 | 120 | 10,000 |
| Example 2 | 80 | 120 | 10,000 |
| Example 3 | 85 | 150 | 15,000 |
| Comparative Example | 3 | 1 | 50 |

A first effect of the present invention is that a polymer secondary battery having a high rate of appearance of capacity and capable of quick charging and discharging can be provided. The reason for this is that, according to the construction of the present invention, the concentration of the chemical species required for oxidation-reduction reactions can be reduced in the vicinity of the electrode layer adjacent to the current collector of the positive electrode and raised in the vicinity of the electrode layer adjacent to the current collector of the negative electrode, and this facilitates the occurrence of oxidation-reduction reactions in the electrodes and thereby accelerates the reactions.

A second effect of the present invention is that a secondary battery exhibiting excellent cycle characteristics can be provided. The reason for this is that, according to the construction of the present invention, the second electrode layer prevents the first electrode layer from coming into contact with oxygen dissolved in the electrolytic solution or oxygen present in the solid electrolyte region, and thereby protects the first electrode layer susceptible to oxidative degradation.

What is claimed is:

1. A polymer secondary battery comprising a positive electrode with a current collector and a negative electrode with a current collector arranged in opposed relationship with an electrolyte solution-containing separator or a solid electrolyte interposed therebetween, said polymer secondary battery having a structure in which, with respect to one or both of the positive and negative electrodes, at least one layer of a second polymer active material is laminated to a first polymer active material layer of the electrode, the second polymer active material layer used for said negative electrode having an oxidation-reduction potential higher than that of said first polymer active material layer of the negative electrode, said first polymer active material layer of the negative electrode is adjacent to the current collector of the negative electrode and the second polymer active material layer used for said positive electrode having an oxidation-reduction potential lower than that of said first polymer active material layer of the positive electrode, said first polymer active material layer of the positive electrode is adjacent to the current collector of the positive electrode.

2. A polymer secondary battery as claimed in claim 1 wherein said negative electrode comprises two or more polymer active material layers each consisting of a polymer selected from the group consisting of quinone polymers, nitrogen-containing heterocyclic compound polymers, nitrogen-containing condensed heterocyclic compound polymers and polyaniline containing polymers.

3. A polymer secondary battery as claimed in claim 2 wherein said first polymer active material layer adjacent to the current collector of the negative electrode consists of a polymer selected from the group consisting of nitrogen-containing heterocyclic compound polymers and nitrogen-containing condensed heterocyclic compound polymers, and said second polymer active material layer of the negative electrode consists of a polymer selected from the group consisting of quinone polymers, nitrogen-containing heterocyclic compound polymers, nitrogen-containing condensed heterocyclic compound polymers and polyaniline containing polymers.

4. A polymer secondary battery as claimed in claim 3 wherein the polyaniline containing polymers are polymers of the general formula

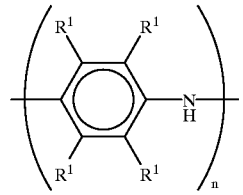

where each $R^1$ independently represents a substituent group having a Hammett substituent constant of 0 or less.

5. A polymer secondary battery as claimed in claim 2 wherein said negative electrode includes, between said first polymer active material layer adjacent to the current collector of the negative electrode and said second polymer active material layer of the negative electrode, a third polymer active material layer having an oxidation-reduction potential which is higher than that of the first polymer active material layer of the negative electrode and lower than that of the second polymer active material layer of the negative electrode.

6. A polymer secondary battery as claimed in claim 3 wherein said negative electrode includes, between said first polymer active material layer adjacent to the current collector of the negative electrode and said second polymer active material layer of the negative electrode, a third polymer active material layer having an oxidation-reduction potential which is higher than that of the first polymer active material layer of the negative electrode and lower than that of the second polymer active material layer of the negative electrode.

7. A polymer secondary battery as claimed in claim 1 wherein said positive electrode comprises a polymer active material layer consisting of a polyaniline containing polymer.

* * * * *